United States Patent [19]
Klema et al.

[11] 3,819,046
[45] June 25, 1974

[54] ARMATURE TESTING DEVICE AND METHOD

[76] Inventors: Kenneth G. Klema, 2209 4½ Mile Rd., Racine, Wis. 53402;
Raymond W. Beffel, 4400 Woodbury Ln., Racine, Wis. 53403

[22] Filed: Apr. 4, 1973

[21] Appl. No.: 347,861

[52] U.S. Cl.................. 209/74 M, 209/82, 324/51
[51] Int. Cl................................................ B07c
[58] Field of Search........... 209/73, 74 R, 74 M, 75, 209/81, 82; 324/51

[56] References Cited
UNITED STATES PATENTS

| | | | |
|---|---|---|---|
| 1,971,426 | 8/1934 | Poole | 209/81 R |
| 2,890,407 | 6/1959 | Huehn et al. | 324/51 |
| 3,464,547 | 9/1969 | Becker | 209/821 X |
| 3,616,901 | 11/1971 | Groves | 209/74 M |

*Primary Examiner*—M. Henson Wood, Jr.
*Assistant Examiner*—Gene A. Church
*Attorney, Agent, or Firm*—Peter N. Jansson

[57] ABSTRACT

A device and method for testing armatures automatically. The device includes an indexing conveyor, cradle means for moving the armatures therefrom to a center position, first and second armature shaft-gripping assemblies aligned on either side of the center position and being constructed to insert the armatures into a test station with required care and in a required orientation, a reject means, and suitable control and sequencing means. The method includes various armature moving and testing steps contemplated to rapidly test armatures with attention to the physical condition of the workpieces.

16 Claims, 7 Drawing Figures

3,819,046

ARMATURE TESTING DEVICE AND METHOD

BACKGROUND OF THE INVENTION

This invention relates generally to testing of armatures and in particular to a method and apparatus for automatic testing of armatures.

Armature testing, as is well known, is an operation heretofore principally initiated by hand. Because of the high degree of care required in movement of armatures to and from an electrical test station and because of the inherent characteristics of armatures which require such, developments in the field of armature testing equipment, as it relates to such movements, have been very limited. Typically, an armature is hand mounted in a mount of the type generally shown in U.S. Pat. No. 2,890,407 (Note FIG. 3 and Col. 2, beginning at line 40). Heretofore, no highly reliable, relatively high speed equipment or method for armature testing was known.

By this invention a highly reliable, relatively high speed armature testing device and method are provided. The device includes an indexing conveyor, cradle means for moving armatures therefrom to a center position between two armature shaft-gripping assemblies of specific construction to adapt them for gripping, inserting and holding the armatures at an electrical test station, and a reject means, all controlled and sequenced by suitable means. The method includes steps for armature moving and testing which make possible rapid and accurate armature movement both to and from a test station.

A primary object of this invention, therefore, is to provide an armature testing device and method which overcome the aforementioned problems.

Another object of this invention is to provide an armature testing device and method which provide accurate, relatively high speed and reliable armature movement and testing.

Another object of this invention is to provide an armature testing device and method which are highly efficient and reliable and relatively problem-free.

These and other important objects of the invention will become apparent from the following description and the drawings showing preferred embodiments of the invention.

BRIEF DESCRIPTION OF THE DRAWINGS

FIG. 2, however, is a detailed view illustrating certain elements of a preferred embodiment of the invention.

DETAILED DESCRIPTION OF A PREFERRED EMBODIMENT

Figure 1:
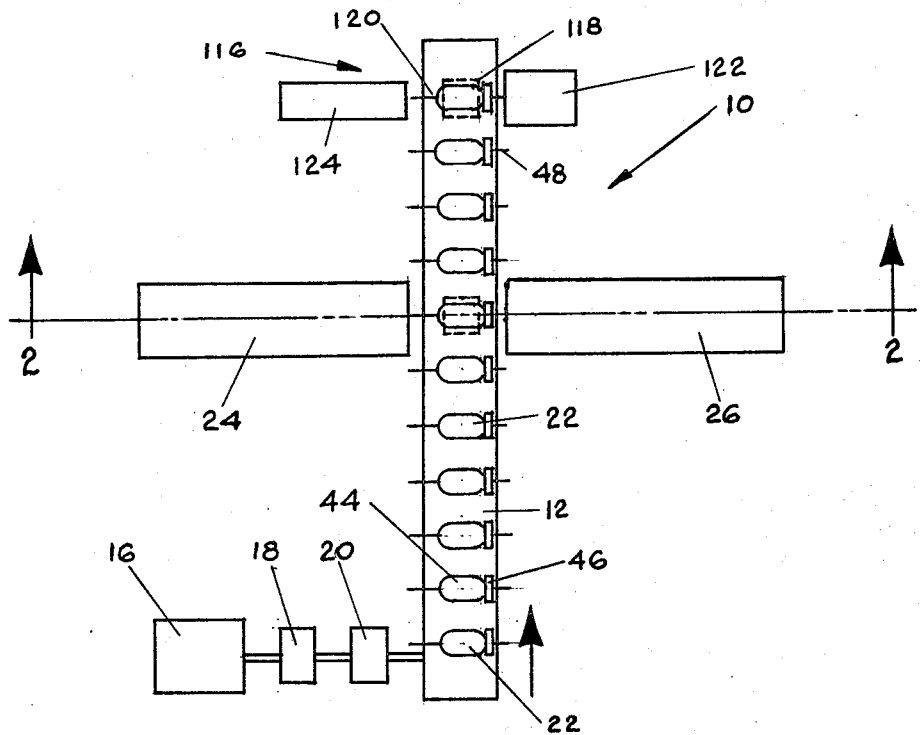
FIG. 1 is a schematic plan view of the device of this invention for testing armatures.

Throughout the figures, like numerals are used for identification of like elements and parts.

The figures show an armature testing device 10 including frame 11 and a conveyor line 12 mounted thereon and adapted to carry armatures. Both ends of the shafts of armatures to be tested rest in slots 14 provided in a manner to suspend the armature free of contact with other portions of the device mechanism. Conveyor 12 may be widened or narrowed by adjustment of conveyor supports 13 to accomodate armatures of different lengths. Conveyor 12 defines an open area between the shaft supporting portions to allow access therethrough. Conveyor 12 is driven by motor 16 through suitable linkage and indexes by means of operation of brake 18 and clutch 20. Slots 14, and therefore armatures 22 therein, are evenly spaced along conveyor 12. Armatures 22 are all in like axial orientation.

Located on either side of conveyor line 12 and on a level above conveyor 12 are two shaft-gripping assemblies, a first shaft-gripping assembly 24 on one side and a second shaft-gripping assembly 26 on the opposite side. Assemblies 24 and 26 are axially aligned to define a test axis 50 on which an armature shaft is aligned during armature testing. Between assemblies 24 and 26 is a center position 28.

After indexing, an armature is located in a first position 30, below center position 28 on conveyor 12. Beneath center position 28 and first position 30 on conveyor 12 is a test lift cylinder 32 on which is mounted a test cradle 34. Cradle 34 may be adjusted on rod 35 to accomodate armatures of varying widths. Test lift cradle 34 is dimensioned to pass through conveyor 12 and lift an armature from conveyor 12 with the stack portion of the armature resting on cradle 34. Cylinder 32, which is preferably a pneumatic cylinder, lifts armature 22 into center (or second) position 28, where 22 will be gripped by assemblies 24 and 26 before insertion into a testing apparatus, as will be described. At center position 28, armatures 22 on cradle 34 are preferably aligned with their shafts 48 just below the test axis 50 for a purpose to be described hereafter.

Figure 2:
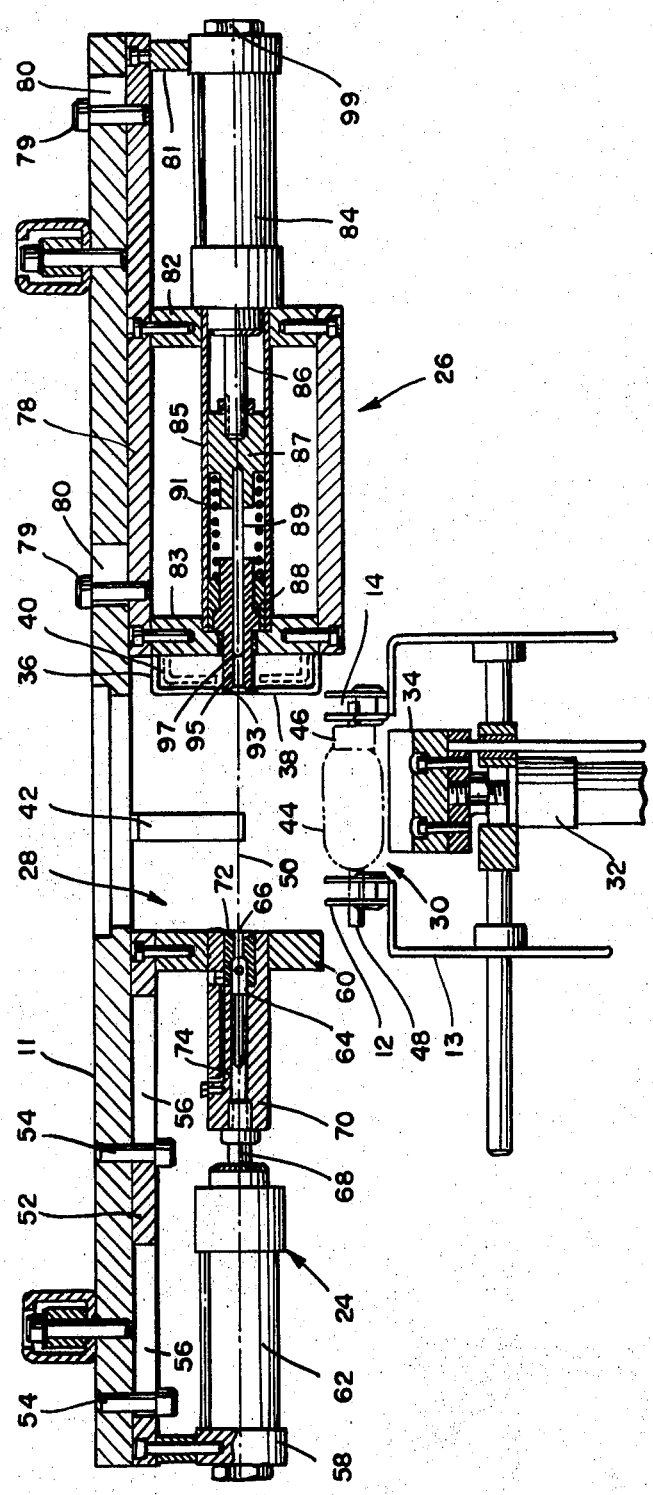
FIG. 2 is a front section view of the main portion of the device of this invention taken along line 2—2 as indicated in schematic FIG. 1.

Adjacent to second shaft-gripping assembly 26 and aligned with the test axis defined by the assemblies 24 and 26 is an annular commutator contact assembly 36 including test housing 38 containing commutator contacts 40, which are shown in phantom lines in FIG. 2.

An alignment dog 42 is suspended from frame 11 in a position allowing the stack portions 44 of armatures 22 to be in contact therewith as lift cylinder 32 lifts armatures 22 to center position 28. This moving contact rotationally orients armature 22 to an orientation suitable for test, namely, with the several commutators 46 aligned with the corresponding commutator contacts 40.

First shaft-gripping assembly 24 includes a mounting member 52 secured by fasteners 54 to frame 11. By virtue of slots 56 in member 52, first assembly 24 is adjustable along test axis 50. Depending from mounting member 52 are supports 58 and 60 which hold a cylinder 62 which is aligned on test axis 50. Also secured to support 60 and located on test axis 50 is a cylindrical stop pin 64. Pin 64, which is in a fixed position along axis 50, has an end 66 adjacent and facing center position 28.

Cylinder 62 has a rod 68 which carries a first gripping member 70. Gripping member 70 has a centering cup surface 72 facing center position 28. Gripping member 70 is annular and defines a cylindrical aperture 74 therethrough along test axis 50 whereby gripping member 70 is sleeved over stop pin 64. Cylinder 62, which is preferably a double-acting pneumatic cylinder, reciprocates gripping member 70 along test axis 50 between a position wherein centering cup surface 72 is adjacent to center position 28 and a position wherein it is inserted well into center position 28. The control of cylinder 62 will be described hereafter.

Aperture 74 is of a diameter smaller than the diameters of shafts of armatures to be tested so that the shafts will not penetrate aperture 74 when center cup surface 72 supports an armature shaft. Centering cup surface 72 is dimensioned to cooperate with an opposite centering cup surface 93 of second shaft-gripping assembly 26, which will be described hereafter, to lift an armature from cradle 34 slightly upward to a position aligned on test axis 50. On cradle 34 in center position 28, armature shaft 48 is on an axis within the centering cup surfaces but just below the centering cup centers. As an armature is supported within the facing centering surfaces, the shaft will readily find the centers thereof and thus be aligned on test axis 50.

Second shaft-gripping assembly 26 includes a mounting member 78 secured by fasteners 79 to frame 11. By virtue of slots 80 in frame 11, second assembly 26 is adjustable along test axis 50. This adjustability, along with the aforementioned adjustability of first shaft-gripping assembly 24 and adjustability to widen conveyor 12, can allow accomodation of armatures of varying lengths. Depending from mounting member 78 are supports 81, 82 and 83. Supports 81 and 82 hold a cylinder 84 and supports 82 and 83 hold a fixed guide housing 85. Cylinder 84 and guide housing 85 are both aligned on axis 50.

Attached to support 83 is test housing 38 which is adjacent to center position 28.

Cylinder 84 has a rod 86 which carries a piston 87 within guide housing 85. Attached to piston 87 and extending toward center position 28 along test axis 50 is an ejector pin 89. Also within guide housing 85 is a generally cylindrical and annular second gripping member 88, which is sleeved over ejector pin 89. Second gripping member 88, is attached to piston 87 by a coil spring 91 and is therefore not fixedly attached to piston 87. Ejector pin 89, however, is fixed through piston 87 to the movement of cylinder rod 86.

Gripping member 88 has a centering cup surface 93 facing center position 28. Gripping member 88 is annular, defining aperture 95 therethrough along test axis 50 to receive ejector pin 89. Gripping member 88 is free to be displaced along test axis 50 from its extended stop position wherein centering cup surface 93 is flush with center position 28. Cylinder 84, which preferably is single-acting (toward center position 28), moves ejector pin 89 from a retracted stop position to an extended position wherein ejector pin end 97 passes through and beyond annular commutator contact assembly 36 to a point within center position 28. The retracted position may be adjusted by adjustment means 99. This may be done to accomodate armatures of different axial dimensions between commutators and the shaft end adjacent the commutators.

Centering cup surface 93 is generally similar to centering cup surface 72 in its dimensioning. As previously described, the two centering cup surfaces coact to lift and grip an armature by its shaft ends. They also hold the armature throughout testing.

The centering cup surfaces and pin end 97 are electrically insulated from frame 11 to avoid interference with the testing of the armature held therebetween. Preferably, first and second gripping members 70 and 88 and piston 87 are non-metallic, while ejector pin 89 (mounted to non-metallic piston 87) is metallic. Various other insulation arrangements are possible and will be apparent to those skilled in the art who are made familiar with this invention.

After an armature 22 is lifted into center position 28 on cradle 34, and is rotationally orientated by dog 42 as previously described, insertion cylinder 62 is actuated to move first gripping member 70 until centering cup surface 72 contacts armature shaft 48 and moves the armature for a very short distance along cradle 34 until the opposite end of the shaft contacts centering cup surface 93. Insertion continues against the resistance of coil spring 91. The coacting centering cup surfaces lift armature 22 slightly to align it with test axis 50. Insertion continues until the shaft end has hit ejector pin 89 and pin 89 is in its retracted position, at which point commutators 46 would be in position for test. Information concerning the test is stored in a memory 108 and is applied later when the tested armature is at a reject station.

After a dwell in the test position, ejector cylinder 84 is actuated and cylinder 62 is reverse-actuated thereby moving armature 22 back along test axis 50 to its original position in center position 28, just above test lift cradle 34. This reverse movement is by contact of ejector pin 89 with armature shaft 48. Ejector pin 89 carries the end of shaft 48 beyond centering cup surface 93 to a point within center position 28, thereby removing it from the support of centering cup surface 93 and allowing it to drop a small distance to cradle 34. Stop pin 64, which is in a fixed axial position, may be used to provide an abutment point for the end of armature shaft 48. Stop pin 64 of this preferred embodiment is helpful in preventing the shaft from tripping on centering cup surface 72 just prior to deposit of the armature on cradle 34.

After armature 22 is deposited on cradle 34, cylinder 32 lowers it until it again rests in slots 14 of conveyor 12. After indexing to a reject station 116, the armature is acted upon on the basis of the stored test information. If acceptable, the armature will remain on the conveyor. If a reject, a reject lift cylinder 118 and a reject removal cylinder 122 will cooperate to remove the armature from conveyor 12 and deposit it on reject tray 124.

Figure 3:
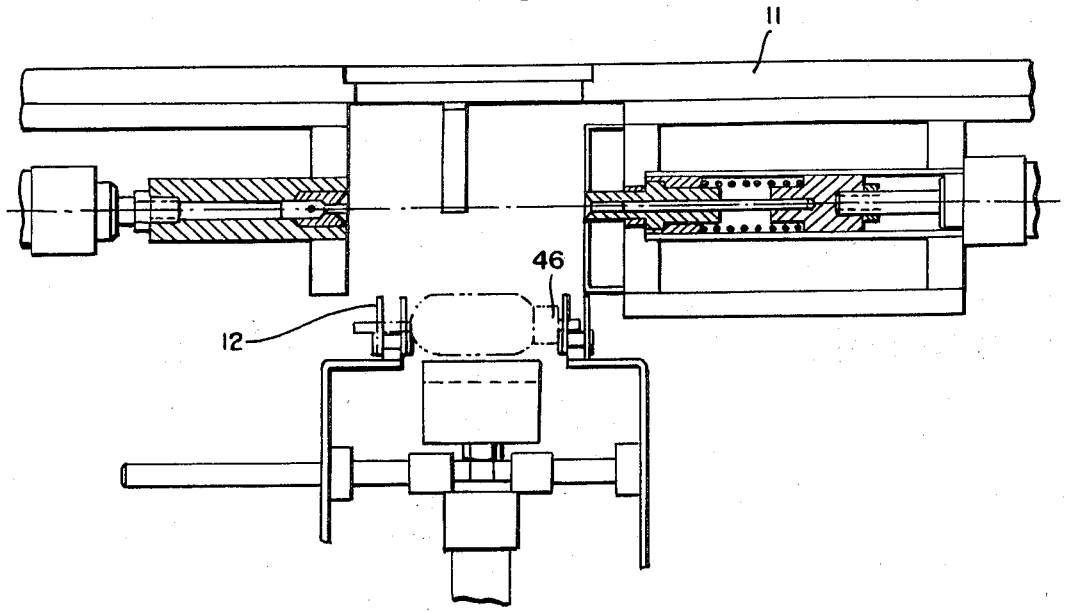
FIGS. 3 through 6 are schematic sectional views showing the device in different phases of operation.
Figure 4:
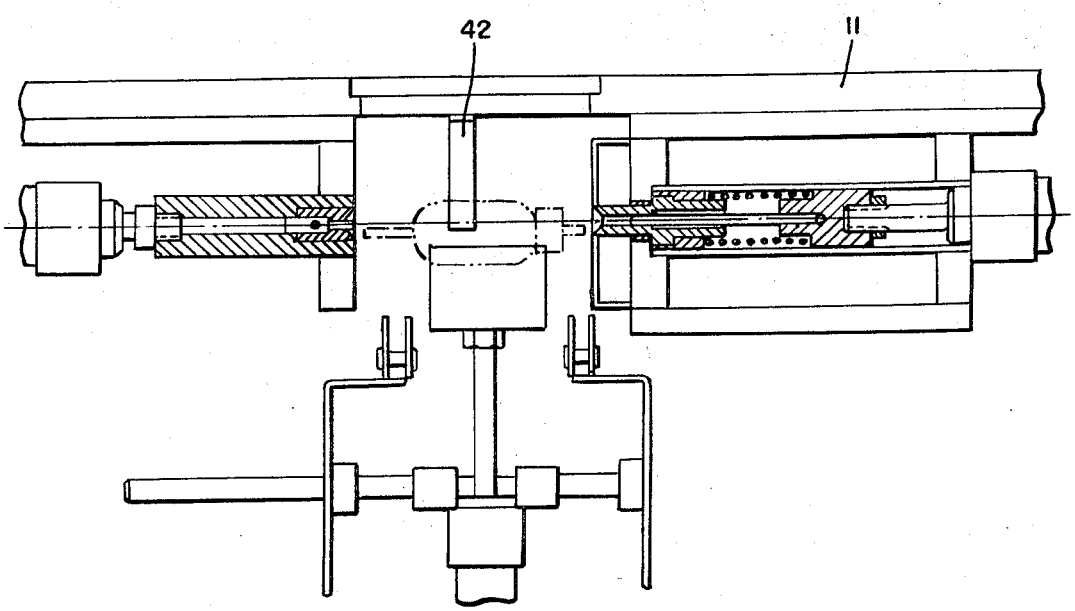
Figure 5:
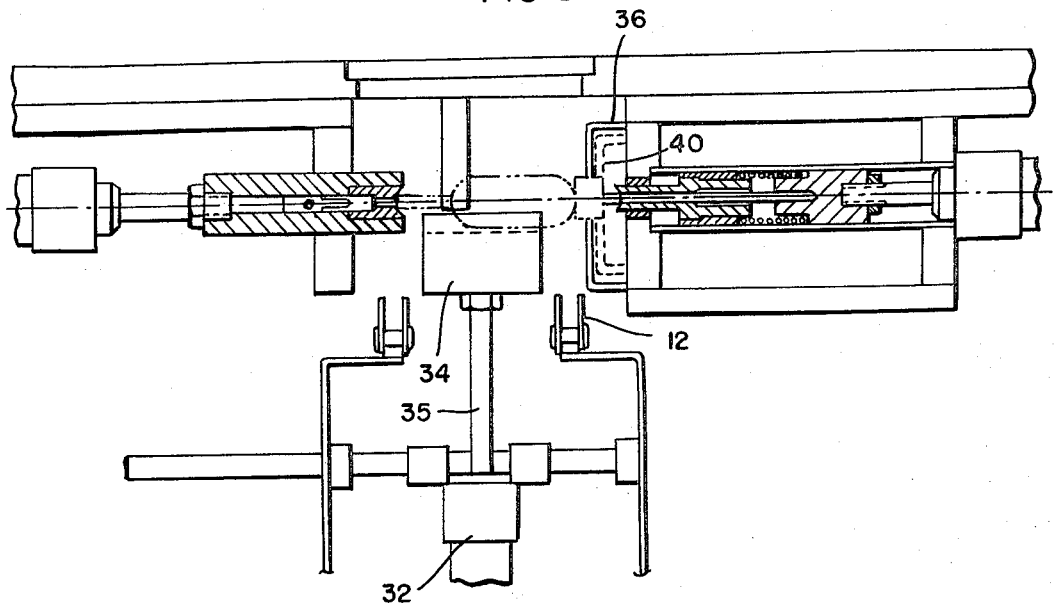
Figure 6:
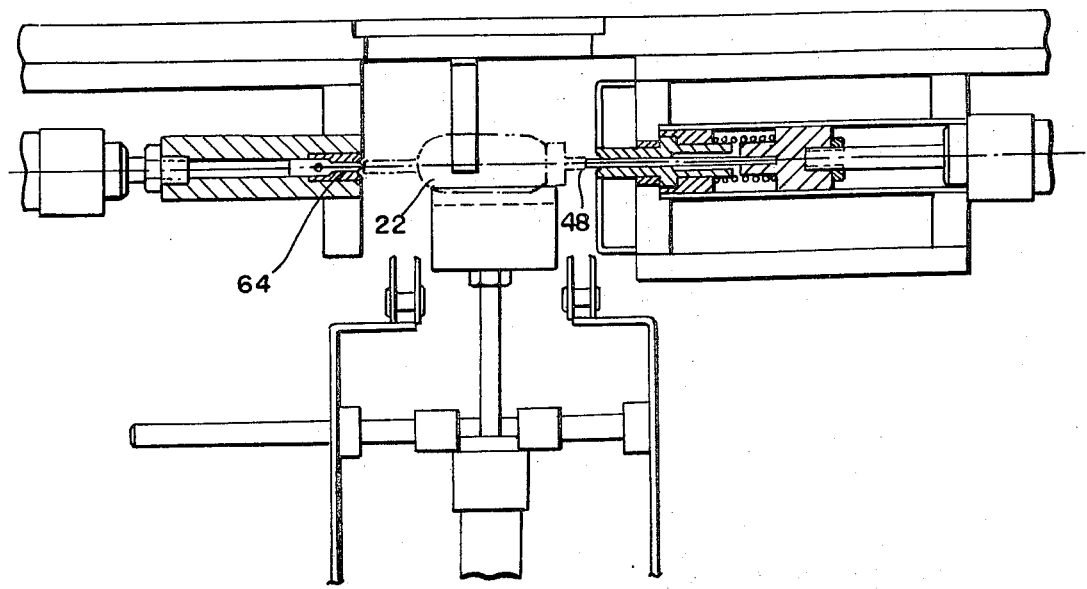

FIGS. 3 through 6 illustrate the phases of operation of this device. FIG. 3 shows an armature 22 on conveyor 12 in a first position, beneath center position 28. FIG. 4 shows the armature lifted to a second position just below test axis 50. FIG. 5 shows the armature inserted into its test position, aligned along test axis 50. FIG. 6 shows the armature ejected in a position just above, and ready to fall a short distance to, the aforesaid second position, which is on cradle 34.

The control and sequencing of the various phases of operation of the armature testing device of this invention may be accomplished by means of a variety of devices. A man skilled in the art, who is made familiar with this invention, could easily provide suitable control and sequencing apparatus.

A preferred control and sequencing system includes cams (driven by either the conveyor drive motor or a secondary motor) which operate micro-switches which control the various parts of this device and steps of this method, and further includes other micro-switches situated at appropriate locations and operated by the motions of the various parts of the device or by workpieces.

Figure 7:
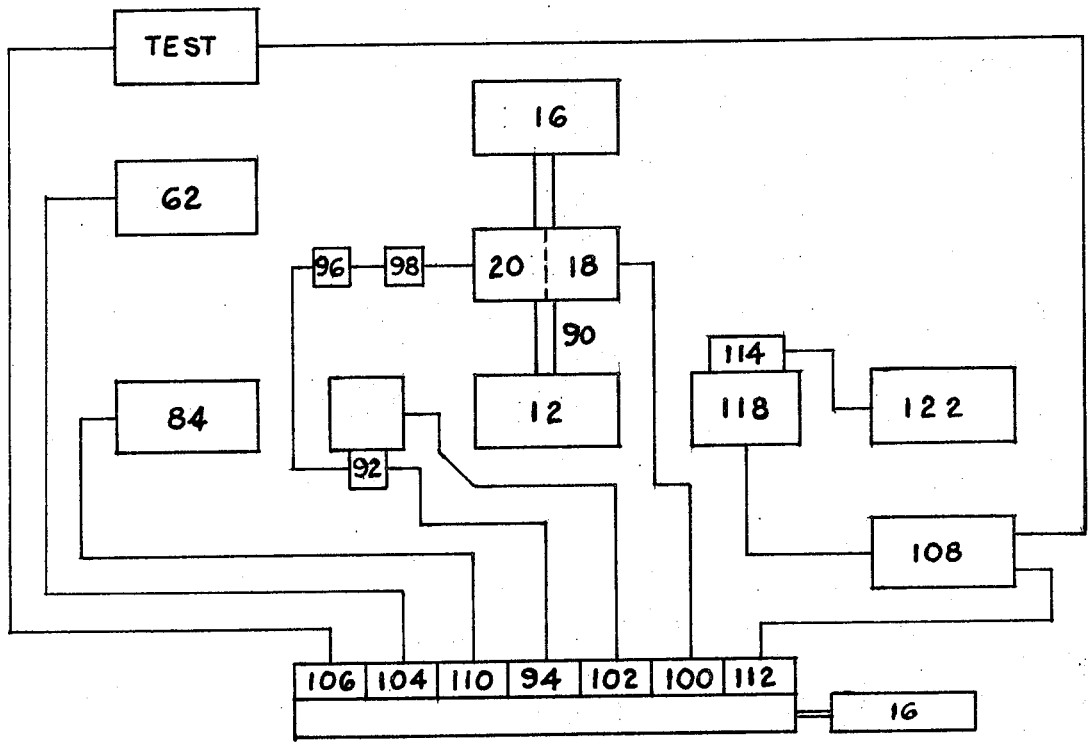
FIG. 7 is a functional schematic view illustrating the control system of a preferred embodiment.

FIG. 7, together with FIG. 1, illustrates a preferred method and apparatus for control and sequencing of this device. Conveyor 12 is driven by motor 16 through conveyor control means 90 which includes brake 18, the actuation of which stops conveyor 12, and clutch 20, the actuation of which moves conveyor 12.

As an armature has been lowered from center position 28 on cradle 34, switch 92 is tripped by test lift cradle 34. Switch 92 and cam-operated switch 94, which is closed by its programmer cam at this time, direct indexing of conveyor 12 through clutch 20. Switches 96 and 98, located in the two conveyor line positions preceeding the test position, allow this indexing motion if they are both closed by workpieces (armatures) awaiting test. Cam-operated switch 100 is thereafter closed, directing brake 18 to stop conveyor 12 in position placing the next armature below center position 28 and above cradle 34.

Cam-operated switch 102 is thereafter closed, actuating test lift cylinder 32 and its associated cradle 34, thereby lifting the armature from slots 14 in conveyor 12 to center position 28 which is located between first and second shaft-gripping assemblies 24 and 26, respectively.

Cam-operated switch 104 is thereafter closed to actuate insertion cylinder 62 to load the armature into commutator contact assembly 36 for testing. Cam-operated switch 106 is thereafter closed to actuate the test. During the test, information concerning the acceptability or non-acceptability of the armature tested is stored in the memory 108.

Thereafter, cam-operated switch 110 is closed, actuating ejection cylinder 84 to remove the armature from commutator contact assembly 36 and cam-operated switch 104 is opened to allow double-acting insertion cylinder 62 to retract, thereby releasing the armature onto cradle 34. As lift cylinder 32 and its cradle 34 are lowered after the closing of switch 94, the foregoing sequence is repeated.

As conveyor 12 indexes, armatures are moved downstream of the test position and are indexed to reject station 116. Cam-operated switch 112, in conjunction with the test information stored in memory 108, actuates (for a reject) or fails to actuate (for a good armature) reject lift cylinder 118. If actuated, the armature is lifted from conveyor 12 on a cradle similar to cradle 34 (but associated with cylinder 118) to a rejection position 120. Switch 114 is closed by such motion, thereby actuating reject removal cylinder 122 momentarily to move the defective armature from the reject cradle. Switch 112 thereafter opens, returning reject lift 118 and its associated cradle to its normal position underlying conveyor 12. Reject lift cylinder 118 and reject removal cylinder 122 are preferably pneumatic cylinders.

Various other systems can be devised to accomplish the foregoing control and sequencing. Electronic flags and proximity sensors provide one alternative scheme.

While in the foregoing specification this invention has been described in relation to certain preferred embodiments, and many details have been set forth for purpose of illustration, it will be apparent to those skilled in the art that the invention is susceptible to additional embodiments and that certain of the details described herein can be varied considerably without departing from the basic principles of the invention.

We claim:
1. An automatic method for testing armatures comprising:
conveying armatures seriatim in a given axial orientation to a first position;
lifting said armatures seriatim, in said axial orientation, to a second position adjacent to an annular commutator contact assembly;
rotationally orienting said armatures at said second position for proper contact with said assembly;
inserting said armatures, in said rotational and axial orientation, from said second position to a position with the commutator portion within said assembly, said armature shaft being electrically insulated;
testing said armatures in said last-named position;
storing test information;
ejecting said armatures, in said axial orientation, from said assembly to said second position;
lowering said armatures, in said axial orientation, to said first position;
conveying said armatures seriatim to reject station; and
treating said armatures at said reject station according to said stored test information.

2. A device for testing armatures comprising:
a frame;
first and second armature shaft-gripping assemblies attached to said frame and defining a center position therebetween and a test axis;
an annular commutator contact assembly adjacent said second assembly and said center position;
means for conveying armatures seriatim to a position adjacent said center position;
cradle means for moving armatures seriatim from said conveying means to said center position with their shafts parallel to said axis;
said first assembly comprising a reciprocating insertion means having a first gripping member aligned along said axis, said first member having a centering cup surface for gripping an armature shaft end, said surface electrically insulated from said frame and reciprocable axially between positions adjacent to and inserted into said center position;
said second assembly comprising ejection means having a drive piston and an attached ejector pin with a pin end axially extendable, from a stop position through and beyond said contact assembly to a position within said center position, a fixed guide housing, a generally annular second gripping member within said housing spring-mounted to said piston and sleeved over said ejector pin, said second gripping member having a centering cup surface for gripping an armature shaft at said commutator end, said pin end and cup surface of said second gripping member electrically insulated from said frame, and said cup surface of said second gripping member displacable against said spring away from an extended stop position flush with said center position; and
means to reject defective armatures.

3. The device of claim 2 wherein said first and second gripping members and said piston are non-metallic.

4. The device of claim 2 further including means to axially adjust at least one of said first and second assemblies on said frame whereby to adjust the axial dimension of said center position.

5. The device of claim 2 wherein said contact assembly is carried by said second assembly.

6. The device of claim 5 wherein said second assembly further includes means to adjust the travel of said ejector pin end whereby armatures of different axial dimensions between commutator and commutator shaft end may be accomodated.

7. The device of claim 6 further including means to axially adjust one of said first and second assemblies on said frame whereby to adjust the axial dimension of said center position.

8. The device of claim 7 wherein said first and second gripping members and said piston are non-metallic.

9. The device of claim 2 wherein said first gripping member is annular and is sleeved over a stop pin, said stop pin being axially fixed along said axis and having an end adjacent and facing said center position.

10. The device of claim 9 wherein said first and second gripping members and said piston are non-metallic.

11. The device of claim 9 further including means to axially adjust one of said first and second assemblies on said frame whereby to adjust the axial dimension of said center position.

12. The device of claim 9 wherein said contact assembly is carried by said second assembly.

13. The device of claim 12 wherein said second assembly further includes means to adjust the travel of said ejector pin end whereby armatures of different axial dimensions between commutator and commutator shaft end may be accomodated.

14. The device of claim 13 further including means to axially adjust one of said first and second assemblies on said frame whereby to adjust the axial dimension of said center position.

15. The device of claim 14 wherein said first and second gripping members and said piston are non-metallic.

16. A device for testing armatures comprising:
a frame;
first and second armature shaft-gripping assemblies attached to said frame and defining a center position therebetween and a test axis;
an annular commutator contact assembly adjacent said second assembly and said center position;
means for conveying armatures seriatim to a position adjacent said center position;
cradle means for moving armatures seriatim from said conveying means to said center position with their shafts parallel to said axis;
said first assembly comprising a reciprocating insertion means having a first gripping member aligned along said axis, said first member having a centering cup surface for gripping an armature shaft end, said surface reciprocable axially between positions adjacent to and inserted into said center position;

said second assembly comprising ejection means having a drive piston and an attached ejector pin with a pin end axially extendable, from a stop position through and beyond said contact assembly to a position within said center position, a fixed guide housing, a generally annular second gripping member within said housing spring-mounted to said piston and sleeved over said ejector pin, said second gripping member having a centering cup surface for gripping an armature shaft at said commutator end, said cup surface of said second gripping member displacable against said spring away from an extended stop position flush with said center position; and
means to reject defective armatures.

* * * * *